United States Patent
Nee et al.

(10) Patent No.: US 7,599,328 B2
(45) Date of Patent: *Oct. 6, 2009

(54) SYSTEM AND METHOD FOR EFFICIENT SELECTION OF A PACKET DATA SERVICING NODE

(75) Inventors: Cheng-Lee Nee, San Jose, CA (US); Gopal K. Dommety, Santa Clara, CA (US); Hancang Wang, San Jose, CA (US); Sudhakar R. Padala, San Jose, CA (US); Qingming Ma, Cupertino, CA (US); Perng-Hwa A. Wu, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/319,347

(22) Filed: Dec. 27, 2005

(65) Prior Publication Data

US 2006/0153129 A1 Jul. 13, 2006

Related U.S. Application Data

(63) Continuation of application No. 09/909,699, filed on Jul. 20, 2001, now Pat. No. 6,980,534.

(51) Int. Cl.
*H04L 12/56* (2006.01)
(52) U.S. Cl. .................. 370/329; 370/356; 709/227
(58) Field of Classification Search .............. 370/329, 370/389, 356, 328, 230; 709/225, 226, 227, 709/229
See application file for complete search history.

(56) References Cited

U.S. PATENT DOCUMENTS

| | | | |
|---|---|---|---|
| 5,671,357 A * | 9/1997 | Humblet et al. | 709/242 |
| 6,370,584 B1 | 4/2002 | Bestavros et al. | 709/238 |
| 6,385,174 B1 | 5/2002 | Li | 370/252 |
| 6,553,006 B1 | 4/2003 | Kalliokulju et al. | 370/310 |
| 6,636,721 B2 | 10/2003 | Threadgill et al. | 455/12.1 |
| 6,665,304 B2 | 12/2003 | Beck et al. | 370/401 |
| 6,708,031 B2 | 3/2004 | Purnadi et al. | 455/436 |
| 6,731,936 B2 | 5/2004 | Chen et al. | 455/437 |
| 6,732,167 B1 | 5/2004 | Swartz et al. | 709/223 |
| 6,775,703 B1 * | 8/2004 | Burns et al. | 790/228 |
| 2002/0016173 A1 | 2/2002 | Hunzinger | 455/456 |
| 2002/0144047 A1 * | 10/2002 | Loy et al. | 711/1 |
| 2002/0188740 A1 | 12/2002 | Tang et al. | 709/230 |
| 2002/0188753 A1 | 12/2002 | Tang et al. | 709/237 |
| 2002/0196749 A1 * | 12/2002 | Eyuboglu et al. | 370/328 |
| 2003/0016653 A1 | 1/2003 | Davis | 370/351 |
| 2003/0016679 A1 * | 1/2003 | Adams et al. | 370/401 |

* cited by examiner

*Primary Examiner*—Brian D Nguyen
(74) *Attorney, Agent, or Firm*—Baker Botts L.L.P.

(57) ABSTRACT

A data communication system is provided that allows for the efficient management of data communication sessions requested from a plurality of packet data servicing nodes organized in a cluster, each member of the cluster managing a cluster session table which contains data identifying mobile units and packet data servicing nodes which are servicing data sessions with the mobile unit. As a mobile unit moves from one portion of the system to another, a network element will request a data session from a packet data servicing node, the packet data servicing node is then able to access the cluster session table to determine if the data session is already being served by another member of the cluster. If the data session is already in existence, the base station controller will be directed to request a data session from the packet data servicing node which is already servicing that session.

15 Claims, 2 Drawing Sheets

SYSTEM AND METHOD FOR EFFICIENT SELECTION OF A PACKET DATA SERVICING NODE

CROSS-REFERENCE TO RELATED APPLICATION

This application is a continuation of U.S. application Ser. No. 09/909,699 filed Jul. 20, 2001 and entitled "System and Method for Efficient Selection of a Packet Data Serving Node", now issued as U.S. Pat. No. 6,980,534.

TECHNICAL FIELD OF THE INVENTION

This invention relates in general to the field of electronic systems and more particularly to an improved system and method for efficiently selecting a packet data servicing node.

BACKGROUND OF THE INVENTION

Modern wireless communication systems are built on an architecture that transfers packets of data from a mobile unit to a base transceiver station (BTS). In these architectures the BTS communicates with a packet control function of a base station controller (BSC/PCF/PCF) which further communicates with a packet data serving node (PDSN). If the mobile device desires a data communication session, the PDSN serves as the termination point for the link layer of the data communication session. The PDSN acts as a gateway for the mobile unit to the public networks.

The operations of this sort of network may become extremely complex as the mobile unit travels from a cell managed by one BTS into a cell managed by a different BTS. If an existing data session is in place, the network must maintain the continuity of the data session but service the data session through other resources that may or may not require other BTSS, BSC/PCF/PCFs or PDSNs. In prior systems, the movement of a mobile unit often required the network to establish a new end to end link for the data session in order to accommodate the moving mobile unit. The time required to format the new data link was inconvenient for the user of the mobile unit because no data could be transmitted while the new link was being formed. In addition, the overlap of resources while the old link is still established and the new link is being formed is an inefficient and expensive waste of network resources.

SUMMARY OF THE INVENTION

Accordingly, a need has arisen for a system and method for processing data communication sessions within a mobile data network that conserves network resources and eliminates unnecessary transfers of data sessions within the network.

In accordance with the teachings of the present invention, a system and method for selecting an appropriate packet data servicing node for a data session is provided which essentially eliminates or reduces problems associated with prior networks and methods of operation.

In accordance with the teachings of the present invention, a data communications network is provided that comprises a packet data servicing node which manages a cluster session table. The cluster session table comprises a list of active data sessions that are serviced by a cluster comprising a plurality of packet data servicing nodes in communication with one another. The packet data servicing node is operable to access the cluster session table and select one of the plurality of packet data servicing nodes to service a data request from a data session request to the packet data servicing node and to direct the network element requesting the data session to one of the plurality of packet data servicing nodes.

An important technical advantage of the present invention inheres in the fact that a requested session can be directed to a packet data servicing node that is already servicing the session. A transfer of a data session between data servicing nodes is not necessary if the packet data servicing nodes are able to communicate with one another and keep track of active sessions that are occurring within a cluster of packet data servicing nodes. This process eliminates unnecessary hand-offs of active data sessions between packet data servicing nodes.

Another technical advantage of the present invention inheres in the fact that the maintenance of a cluster session table by each packet data servicing node within the cluster of packet data servicing nodes allows for load balancing and robust operation by the cluster of packet data servicing nodes. When a request for a data session is received by a member of the cluster, the packet data servicing node receiving such request can access the cluster session table and select a member of the cluster of packet data servicing nodes that is available to service the data session and has the most resources to bring to bear at that time. The use of this communication system and cluster session tables also provides that members of the cluster can be added or eliminated without affecting the overall operation of the network. In this manner, the servicing of data sessions occurs in both a scalable and robust fashion.

BRIEF DESCRIPTION OF THE DRAWINGS

A more complete understanding of the advantages of the present invention may be acquired by referring to the accompanying figures in which like reference numbers indicate like features and wherein.

DETAILED DESCRIPTION OF THE DRAWINGS

Figure 1:
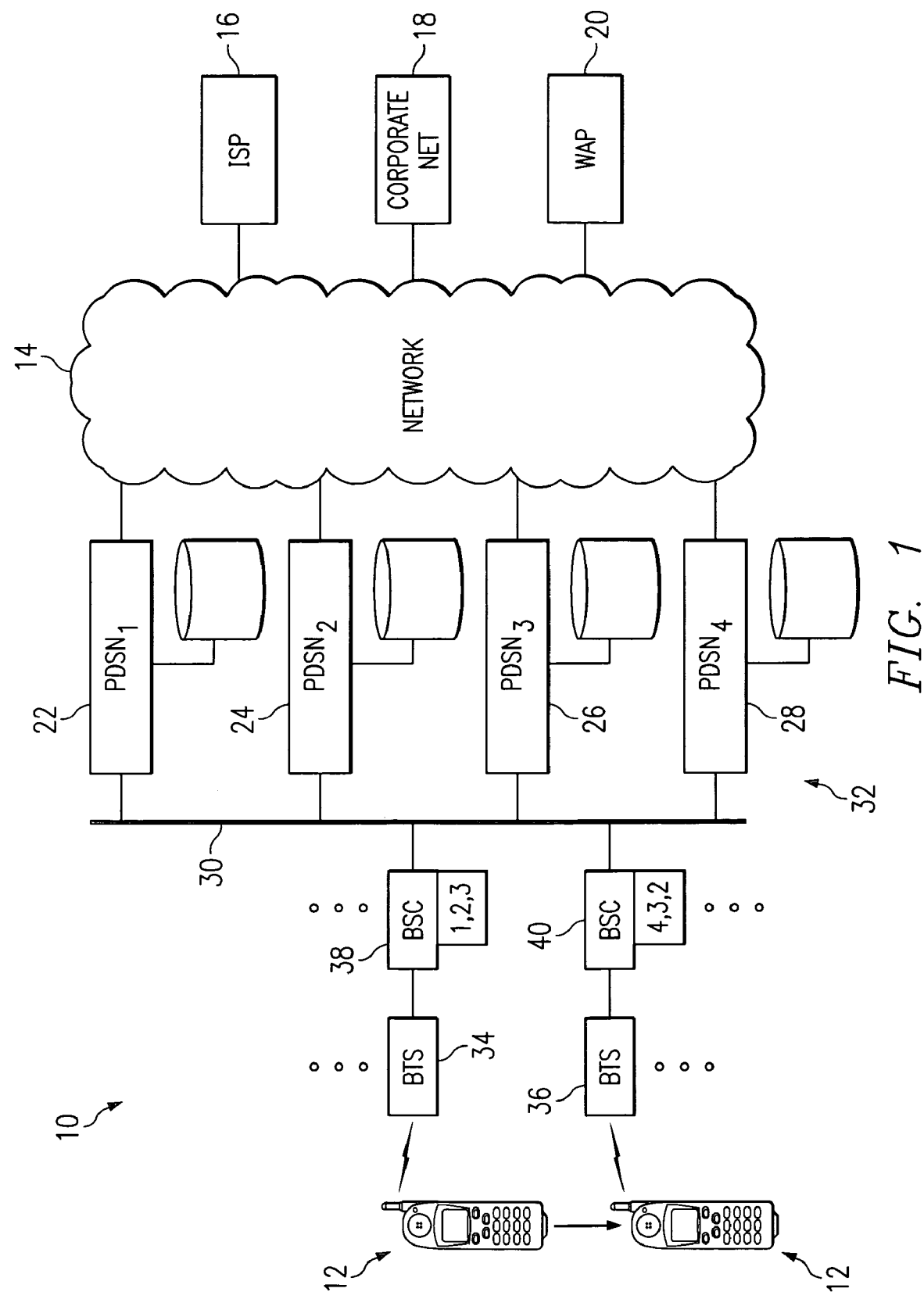
FIG. 1 is a block diagram to one embodiment of a data communications system constructed according to the teachings of the present invention.

FIG. 1 illustrates a data communication system 10 which enables a mobile unit indicated generally at 12 to access through a data communication session various data sources. Referring to FIG. 1, the mobile unit 12 accesses a public network 14 which is connected to various data services such as an Internet service provider 16, a corporate network 18, or a wireless access protocol server 20. The public network 14 may be a publicly available computer network such as the Internet. Modern standard architectures allow for the mobile unit 12 to interface with the public network 14 by establishing a communication session through system 10 with a link layer of such session being terminated in a PDSN 22, PDSN 24, PDSN 26, or PDSN 28 shown in FIG. 1. According to the teachings of the present invention, PDSNs 22 through 28 are connected to one another through a private network 30 and communicate with one another to form a PDSN cluster indicated generally at 32 in FIG. 1.

The radio interface between the mobile unit and the remainder of system 10 is established with a base transceiver station such as BTS 34 or 36. Further, BTS units 24 and 36 communicate to the members of PDSN cluster 32 through base station controllers such as BSC/PCF/PCF 38, or 40 shown in FIG. 1. Typically, each BSC/PCF/PCF will be configured with an address of a PDSN or with a list of addresses of PDSNs to contact for access to needed data networks. As shown in FIG. 1, BSC/PCF/PCF 38 is configured with addresses 1, 2, and 3 corresponding to PDSNs 22, 24, and 26, respectively. Similarly, BSC/PCF/PCF 40 is configured to contact PDSNs 28, 26, and 24 at addresses 4, 3, and 2, respectively. These configurations are shown solely for purposes of teaching the present invention. In actual networks, larger numbers of network elements would be involved and different addressing schemes, such as internet protocol (IP) addresses may be used.

As will be discussed herein, the formation of PDSN cluster 32 is established through the communication of messages between the members of PDSN cluster 32 whenever a new data session is established by a member of the cluster. In this manner, each member of the PDSN cluster 32 has a full and accurate record, stored in a cluster session table, of all data sessions that are occurring between mobile units and any member of the cluster. The fact that each member of the cluster has this information allows the operation of data system 10 to be much more efficient than conventional systems. As shown in FIG. 1, a mobile unit 12 during the pendency of a data communication session can travel between an area managed by BTS 34 to the area managed by BTS 36. In conventional systems, this would cause the BSC/PCF 40 to attempt to establish a new data session with a PDSN associated with BSC/PCF 40. For example, in some conventional architectures a BSC/PCF such as BSC/PCF 40 would have a table of PDSNs that it would try in a round robin fashion. According to other conventional architectures, a BSC/PCF such as BSC/PCF 40 would always try a single PDSN first and would direct the session to other PDSNs only if instructed by the initial master PDSN. Using either of these conventional systems a new data session must be established with the PDSN before the mobile unit 12 can continue the data session which was already in place when communication was established with the BTS 34. During this transient period of time, no data can be communicated to or from the mobile unit 12 which can be very inconvenient for the user of the mobile unit 12 and can result in lost data or interruption of services.

In contrast, the system of the present invention provides that the data session established between mobile unit 12 and BTS 34 is known to all members of the PDSN cluster 32 because the data session is identified in each cluster session table maintained by the PDSNs within cluster 32. The members of the cluster can recognize the identification of the mobile unit 12 within a cluster session table stored by each of the members of cluster 32 by the mobile unit identifier associated with the unit. Using the table, the new PDSN 40 can recognize the existing data session and direct BSC/PCF 40 to the PDSN which was already servicing the pre-existing data session, in this case, PDSN 38. In this manner, a new session need not be created and the new link layer parameters need not be negotiated and established. This process greatly reduces the latency inherent in the movement of a mobile unit from one cell to another within a data network.

Referring again to FIG. 1, it can be seen for example, BSC/PCF 38 is configured with the addresses associated with PDSN 22, PDSN 24, and PDSN 26 in that order. Similarly, BSC/PCF 40 is configured with the addresses for PDSN 28, PDSN 26, and PDSN 24 in that order. According to one embodiment of the present invention, the private network 30 utilizes Internet protocol addressing and therefore the addresses of the various members of PDSN cluster 32 would comprise IP addresses. As will be shown herein, regardless of the information stored in the configuration tables of BSC/PCF 38 or BSC/PCF 40, the operation of the PDSN cluster 32 will direct the BSC/PCF to connect the data session to the appropriate member of cluster 32. In this manner, the operation of the cluster 32 does not depend upon reconfiguring or any particular initial configuration of the routing operation of a BSC/PCF such as BSC/PCF 38 or BSC/PCF 40.

Figure 2:
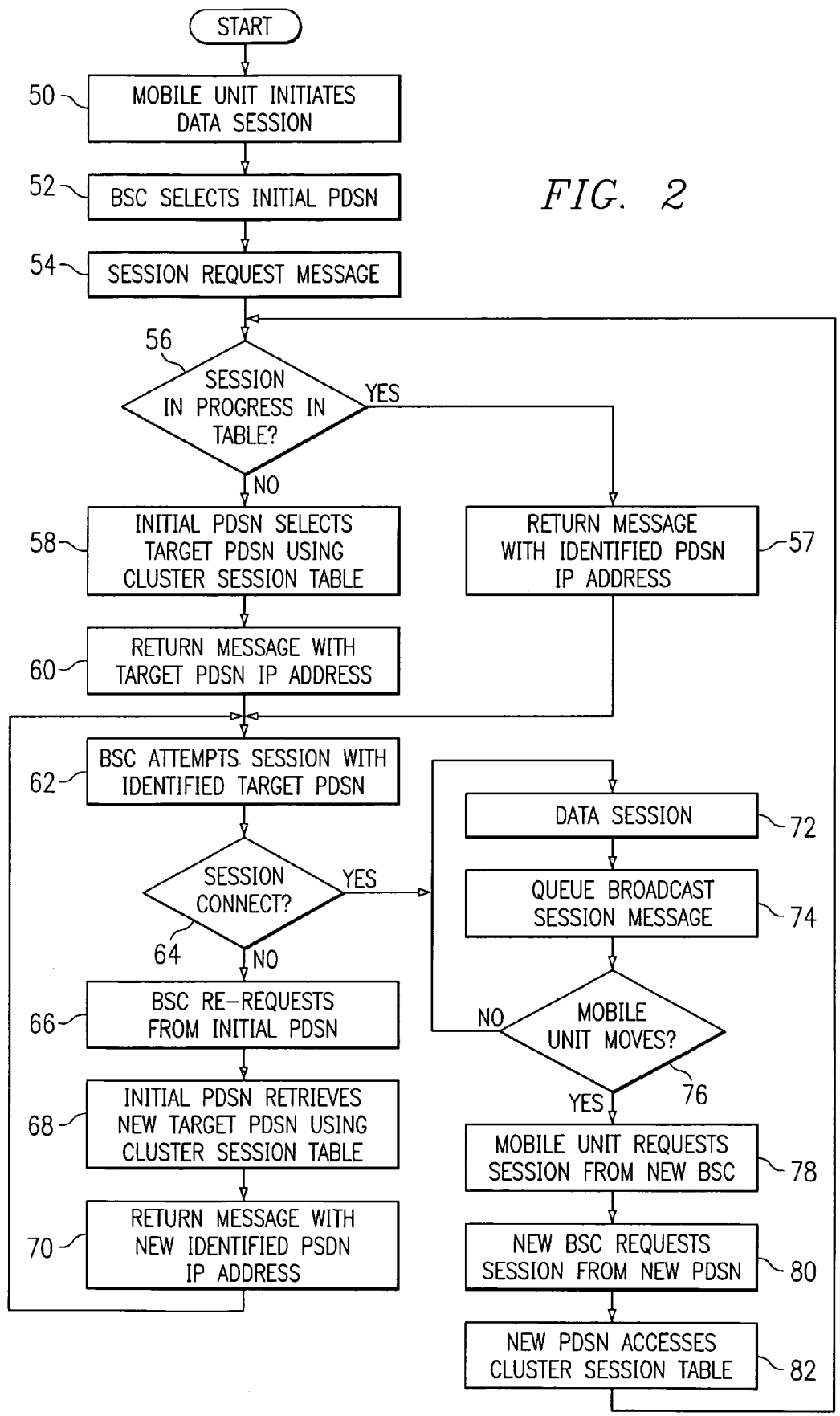
FIG. 2 is a flow diagram illustrating a method of managing data communications according to one embodiment of the present invention.

FIG. 2 is a flow diagram which illustrates the operation of communication system 10 and the interaction of both the initial BSC/PCF and the new BSC/PCF as a mobile unit, such as mobile unit 12, moves within the various cells of operation of system 10. The method begins at step 50 where a mobile unit initiates a data session. This may comprise for example, mobile unit 12 initiating contact with BTS 34 requesting a data session. BTS 34 would relay this request to BSC/PCF 38. The method then proceeds to step 52 where the initial BSC/PCF selects an initial PDSN from which to request services for the data session. Referring to FIG. 1, BSC/PCF 38 would request a data session from PDSN 22 because of the round robin approach associated with BSC/PCF 38 and its ordering of addresses for various PDSNs used by BSC/PCF 38. BSC/PCF 38 would then send a session request message to PDSN 22 as reflected in step 54 in FIG. 2. The method then proceeds to step 56 where PDSN 22 would access the current cluster session table stored in storage associated with PDSN 22. The cluster session table is a table which is kept by each member within cluster 32 and comprises session record for each existing data session. Each session record comprises a mobile user ID and the IP address of the PDSN which is servicing that mobile unit. PDSN 22 would utilize the mobile unit identifier associated with mobile unit 12 received in the request message from BSC/PCF 38 to access the cluster session table. If the PDSN 22 finds an existing session in progress associated with that mobile unit, the method proceeds from step 56 to step 58 where a message is returned to the BSC/PCF 38 directing the BSC/PCF 38 to utilize an identified IP address associated with the PDSN that is already associated with a data session servicing that mobile unit identifier. The method then proceeds to branch point A which will be described more completely herein.

If at step 56, the PDSN 22 found no session in progress associated with the mobile unit identifier associated with mobile unit 12, the method proceeds to step 58 where the initial PDSN selects a target PDSN using the cluster session table. The cluster session table also includes information associated with the session count for each PDSN within the cluster 32. In this manner, the initial PDSN contacted by a BSC/PCF requesting a new data session can access the session count associated with the members of cluster 32 and determine which member is servicing the least number of active data sessions. In this manner, the load associated with the data sessions can be balanced evenly over the members of the cluster 32. The method then proceeds to step 60 where the PDSN initially contacted, in this case PDSN 22, returns a message to the BSC/PCF 38 with the target PDSN IP address selected from the cluster session table. The method then proceeds to branch point A.

From branch point A accessed from either steps 58, 60 or 70, the method proceeds to step 62 where the BSC/PCF 38 attempts to create a session with the returned IP address of the identified target PDSN. As discussed previously, this is either the PDSN with the lowest session count or the PDSN which is already servicing the data session and is entered in the cluster session table associated with the mobile unit ID associated with mobile unit 12. The method then proceeds to decision point 64 where a determination is made as to whether or not the session was successfully connected with the target PDSN.

If at step 64, the session was not successfully connected the method proceeds to step 66 where the BSC/PCF 38 will issue a new request message to the initial PDSN, in this case PDSN 22. The method then proceeds to step 68 where PDSN 22 retrieves a new target PDSN once again using the cluster session table. The initial PDSN contacted will store a flag within the cluster session table to indicate that the BSC/PCF has been directed to contact the first target PDSN. If the same BSC/PCF returns requesting a session using the same mobile unit identifier, the initial PDSN can conclude that the first target PDSN is not able to accept the session. This could occur because the first target PDSN is inoperative or is occupied with too many data sessions. In either case, the initial PDSN will direct the BSC/PCF to a new target PDSN. As such, the method proceeds to step 70 where the initial PDSN returns a message to the BSC/PCF 38 with a new identified PDSN IP address. The method then returns to branch point A where the method will proceed to step 62 and the BSC/PCF will attempt to create the data session with the new IP address.

If at step 64, the session was successful and the data session proceeds, the method proceeds to step 72 where the data session is managed by the particular BSC/PCF and PDSN associated with the data session. The method then proceeds to step 74 where a broadcast IP message is placed in a queue by the PDSN which has initiated the data session. Each PDSN will create a broadcast IP message directed to all of the other members within the cluster 32 whenever a new data session is created. On a periodic basis, for example every six minutes, this queue will be emptied and a broadcast IP message containing the mobile unit identifiers and the IP addresses of the servicing PDSN will be broadcast to all members of the cluster 32. Upon receipt of such a message, each PDSN within the cluster 32 will use the contents of the message to update the cluster session table stored by each member. In addition, if the queue ever becomes full or reaches a predetermined threshold size the queue will automatically be emptied into a broadcast IP message even if this occurs before the predetermined timeout period has expired. In addition, the members of the PDSN cluster 32 may also periodically transmit a full copy of the cluster session table in a broadcast format. In this manner, periodically, each member of the cluster can resynchronize their local table in case they have missed any sessions or terminations of sessions. According to another embodiment of the present invention, whenever a PDSN is powered on or reboots its system, the PDSN will automatically request a full session table from the members of the cluster 32. In this manner, the PDSN through initialization can receive a full and accurate session table from all members of the cluster 32.

Additional messages can be sent between members of the cluster 32 which communicate to the other members of the cluster that a particular PDSN has been removed from the cluster. In this manner, the IP address of the PDSN can be transmitted to all members of the cluster 32 and the sessions associated with that IP address can be deleted from the cluster session tables kept by each member. Similarly, on a periodic basis, the members of the cluster can transmit "keep-alive" messages to one another to communicate the fact that they are still operating within the cluster. These keep-alive messages can be transmitted on a periodic basis so that a member of a cluster that does not receive a keep-alive message from another member may take measures appropriate to a situation where one of the members of the cluster has been brought offline for some reason.

Returning again to FIG. 2, the method proceeds from step 74 to step 76 where a determination is made as to whether or not the mobile unit has moved from one portion of data communication system 10 to another. If the mobile unit has moved, for example if mobile unit 12 moves from the area associated with BTS 34 to the area associated with BTS 36, a new BSC/PCF, namely BSC/PCF 40, will need to service the data communication session already in place between mobile unit 12 and BSC/PCF 38. As such, the method proceeds from step 76 to step 78 where mobile unit 12 requests a new session through BTS 36 to BSC/PCF 40. The method then proceeds to step 80 where BSC/PCF 40 requests a session from a new PDSN within PDSN cluster 32. Referring to FIG. 1, the PDSN IP address table within BSC/PCF 40 indicates that BSC/PCF 40 would request a session from PDSN 28. The method would then proceed to step 82 where the PDSN 28 will access the cluster session table stored by PDSN 28 to attempt to identify an existing data session associated with mobile unit 12. The method then proceeds to branch point B which reenters the method in FIG. 2 prior to step 56. At step 56, PDSN 28 will determine whether or not a session is in progress by accessing the records stored within the local cluster session table stored by PDSN 28. In this case, because mobile unit 12 had an existing session in place, the method will branch to step 58 where PDSN 28 will return a message with the IP address of the PDSN within cluster 32 which was already servicing mobile unit 12 before mobile unit 12 moved to the area managed by BTS 36. The method will then proceed to step 62 where BSC/PCF 40 will attempt to contact the identified target PDSN which was previously servicing the data session associated with mobile unit 12.

In this manner, the complex and lengthy process of handing a data session off between PDSNs is eliminated whenever a mobile unit moves within areas of a data communication system that are managed by a single PDSN cluster 32. The latency associated with these processes is eliminated and the cluster of PDSNs is able to evenly distribute the data communication load amongst the members of the cluster. In addition to efficiently distributing load, the architecture of the present invention is also readily scalable and robust. If a new PDSN is added to the cluster 32, the members of the cluster may be notified by a broadcast message from the new PDSN. The members will then each update their local tables to include the new PDSN and will assign the new PDSN session until the load is evenly distributed. This will occur without any reconfiguration of the BSC/PCF units requesting sessions but, rather, merely through the identification of the new PDSN in response messages to the BSC/PCFs. The same thing will occur if a PDSN goes offline for some reason. The actions of the cluster will evenly redirect sessions directed to the missing PDSN.

Although the present invention has been described in detail, it should be understood that various changes, modifications, alterations, and substitutions may be made from the teachings described herein without departing from the spirit of the present invention which is solely defined by the appended claims.

What is claimed is:

1. A data communication system, comprising:
 a plurality of packet data servicing nodes operable to communicate with each other,
 wherein each packet data servicing node is operable to store and manage a cluster session table, each cluster session table comprising a complete list of all presently active data communication sessions managed by the plurality of packet data servicing nodes within a cluster; and
 wherein each packet data servicing node is operable to receive a request for a data communication session originating from a mobile unit presently being serviced by one of the plurality of packet data servicing nodes in an existing data communication session, and responsive to the request each packet data servicing node is operable to access its cluster session table to identify the packet data servicing node within the plurality that is presently servicing the mobile unit to service the requested data communication session.

2. The system of claim 1, wherein each packet data servicing node within the plurality is operable to select one of the plurality of packet data servicing nodes to service the data communication session by accessing the cluster session table and using information within the cluster session table to identify the packet data servicing node which is servicing the least number of data communication sessions at that particular time.

3. The system of claim 1, wherein each packet data servicing node within the plurality is operable to generate a message to a base station controller requesting a data communication session, the message comprising an address of an identified packet data servicing node which has been identified by the packet data servicing node transmitting the message through the use of the cluster session table.

4. The system of claim 3, wherein each packet data servicing node within the plurality is operable to use the cluster session table to determine if a requested data session is already being serviced by a different packet data servicing node, and, if so, to direct the requesting base station controller to contact the identified servicing packet data servicing node.

5. The system of claim 1, wherein each packet data servicing node within the plurality is operable to transmit at least a portion of the cluster session table to the remaining packet data servicing nodes within the plurality to allow for a resynchronization of the cluster session tables stored by each member of the plurality of packet data servicing nodes.

6. The system of claim 5, wherein each packet data servicing node within the plurality is operable to transmit at least a portion of its cluster session table on a periodic basis.

7. The system of claim 5, wherein each packet data servicing node within the plurality is operable to transmit at least a portion of its cluster session table when requested by one of the plurality of packet data servicing nodes upon the initialization of the requesting packet data servicing node.

8. A method of managing a data communication session comprising:

receiving a request for a data communication session from a mobile unit at a packet data servicing node;

accessing a cluster session table stored at and managed by the packet data servicing node, wherein the cluster session table comprises a complete list of all presently active data communication sessions within a cluster of packet data servicing nodes including the packet data servicing node receiving the request;

identifying an appropriate packet data servicing node within the cluster that is presently servicing the mobile unit in an existing data communication session to service the requested data communication session; and transmitting a message to a base station controller requesting the data communication session, the message including an address for the identified appropriate packet data servicing node.

9. The method of claim 8, wherein the step of identifying an appropriate packet data servicing node to service the data communication session comprises the step of identifying a packet data servicing node within the cluster which is already servicing the data communication session by identifying the mobile unit associated with the requested data communication session in an entry within the cluster session table.

10. The method of claim 8, wherein the step of identifying the appropriate packet data servicing node within the cluster comprises the step of identifying using the cluster session table the member of the cluster which is servicing the fewest number of data communication sessions at the time of the request.

11. The method of claim 8, further comprising:

generating a session creation message comprising the identity of the mobile unit requesting the data communication session and the address for the identified appropriate packet data servicing node; and transmitting the session creation message to the remaining members of the cluster.

12. The method of claim 11, wherein the step of transmitting the session creation message comprises the step of transmitting a plurality of session creation messages on a periodic basis.

13. The method of claim 11, wherein the step of transmitting the session creation message comprises the step of transmitting the session creation message when a predetermined number of the session creation messages have been generated and stored.

14. The method of claim 8, further comprising:

generating and transmitting a packet data servicing node keep-alive message from each member within the cluster to the remaining members of the cluster on a periodic basis such that each member of the cluster monitor the continuing processing capability of each member of the cluster.

15. The method of claim 8, further comprising:

requesting a copy of the cluster session table from each member of the cluster upon the initialization of a member of the cluster.

* * * * *

UNITED STATES PATENT AND TRADEMARK OFFICE
CERTIFICATE OF CORRECTION

PATENT NO. : 7,599,328 B2 Page 1 of 1
APPLICATION NO. : 11/319347
DATED : October 6, 2009
INVENTOR(S) : Nee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Twenty-eighth Day of September, 2010

David J. Kappos
*Director of the United States Patent and Trademark Office*